US008355585B2

(12) United States Patent
Kamay et al.

(10) Patent No.: US 8,355,585 B2
(45) Date of Patent: Jan. 15, 2013

(54) DATA COMPRESSION OF IMAGES USING A SHARED DICTIONARY

(75) Inventors: Yaniv Kamay, Modi (IL); Yonit Tova Halperin, Herzelia (IL)

(73) Assignee: Red Hat Israel, Ltd., Raanana (IL)

( * ) Notice: Subject to any disclaimer, the term of this patent is extended or adjusted under 35 U.S.C. 154(b) by 881 days.

(21) Appl. No.: 12/464,820

(22) Filed: May 12, 2009

(65) Prior Publication Data

US 2010/0293248 A1 Nov. 18, 2010

(51) Int. Cl.
G06K 9/36 (2006.01)
(52) U.S. Cl. ........................................ 382/232
(58) Field of Classification Search .................. None
See application file for complete search history.

(56) References Cited

U.S. PATENT DOCUMENTS

| | | | |
|---|---|---|---|
| 4,464,650 A * | 8/1984 | Eastman et al. ............... 341/51 |
| 5,379,036 A * | 1/1995 | Storer ............................ 341/51 |
| 5,841,376 A * | 11/1998 | Hayashi ......................... 341/51 |
| 6,035,323 A * | 3/2000 | Narayen et al. .............. 709/201 |
| 6,058,428 A * | 5/2000 | Wang et al. .................. 709/232 |
| 6,591,011 B1 * | 7/2003 | Nielsen ......................... 382/218 |
| 6,606,040 B2 * | 8/2003 | Abdat ............................ 341/87 |
| 6,714,205 B1 * | 3/2004 | Miyashita et al. ............ 345/536 |
| 7,460,151 B2 * | 12/2008 | Minatogawa ............. 348/207.1 |
| 7,576,752 B1 * | 8/2009 | Benson et al. ................ 345/619 |
| 7,623,047 B2 * | 11/2009 | Ordentlich et al. ............ 341/51 |
| 7,634,144 B2 * | 12/2009 | Kim .............................. 382/232 |
| RE41,152 E * | 2/2010 | Reynar et al. ................. 708/203 |
| 7,750,826 B2 * | 7/2010 | Schneider ...................... 341/51 |
| 7,869,074 B2 * | 1/2011 | Uno ............................. 358/1.15 |
| 2002/0016819 A1 * | 2/2002 | Sugimoto et al. ............ 709/203 |
| 2003/0058255 A1 * | 3/2003 | Yamagishi ..................... 345/619 |
| 2003/0223650 A1 * | 12/2003 | Kim .............................. 382/302 |
| 2005/0213147 A1 * | 9/2005 | Minatogawa ................ 358/1.15 |
| 2006/0050973 A1 * | 3/2006 | Ishikawa ....................... 382/232 |
| 2006/0251338 A1 * | 11/2006 | Gokturk et al. ............... 382/305 |
| 2008/0166057 A1 * | 7/2008 | Nakajima ..................... 382/229 |
| 2009/0106405 A1 * | 4/2009 | Mazarick et al. ............. 709/222 |
| 2009/0285506 A1 * | 11/2009 | Benson et al. ................ 382/299 |

OTHER PUBLICATIONS

Deutsch, P., "DEFLATE Compressed Data Format Specification version 1.3," Network Working Group, May 1996, 15 pages.

(Continued)

*Primary Examiner* — Samir Ahmed
(74) *Attorney, Agent, or Firm* — Lowenstein Sandler PC (57) ABSTRACT

A method and system for data compression of images using a shared dictionary are described herein. According to one embodiment, a server identifies a current images that is part of a stream of images generated by an application hosted by the server. The stream of images includes images previously transmitted to the client. For each segment of pixels in the current image, the server searches a dictionary containing data for the stream of images. If the dictionary includes data corresponding to the segment of pixels in the current image, the server determines metadata for the segment of pixels in the current image using the corresponding data from the dictionary, and transmits the metadata to the client without transmitting the segment of pixels from the current image.

17 Claims, 7 Drawing Sheets

OTHER PUBLICATIONS

Korn, D., et al, "The VCDIFF Generic Differencing and Compression Data Format," Network Marketing Group, Jun. 2002, 26 pages.

Ziv, Jacob, et al, "A Universal Algorithm for Sequential Data Compression," IEEE Transaction on Information Theory, vol. IT-23, No. 3, May 1977, pp. 337-343.

Ziv, Jacob et al., "A Universal Algorithm for Sequential Data Compression," IEEE Transactions on Information Theory, vol. IT-23, No. 3, May 1977, pp. 337-343.

Korn, D. et al., "The VCDIFF Generic Differencing and Compression Format," The Internet Society, Network Working Group, Request for Comments: 3284, Category: Standards Track, Jun. 2002, 26 pages.

Deutsch, P. "DEFLATE Compressed Data Format Specification version 1.3," The Internet Society, Network Working Group, Request for Comments: 1951, Category: Informational, May 1996, 15 pages.

"Solid Ice: Provisioning Manager," Qumranet, Apr. 2008, 5 pages.

"Solid Ice: Virtual Desktop Server (VDS)," Qumranet, Apr. 2008, 6 pages.

"Solid Ice: Connection Broker," Qumranet, Apr. 2008, 7 pages.

"Solid Ice: Overview," Qumranet, Apr. 2008, 15 pages.

"KVM—Kernel-based Virtualization Machine," Qumranet, white paper, 2006, 5 pages.

* cited by examiner

DATA COMPRESSION OF IMAGES USING A SHARED DICTIONARY

TECHNICAL FIELD

The present invention relates generally to graphics remoting. More particularly, this invention relates to data compression of images using a shared dictionary.

BACKGROUND

Graphics remoting systems allow computing device network clients to connect to a remote server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

In some computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data.

Thus, input is received and output is presented at the client computer system, while processing actually occurs at the terminal server. In most, if not all terminal server environments, input data (entered at a client computer system) typically includes mouse and keyboard data representing commands to an application and output data (generated by an application at the terminal server) typically includes video data for display at a display device.

Recently, desktop virtualization or virtual desktop infrastructure has become more popular. Desktop virtualization is a server-centric computing model that borrows from the traditional thin-client model but is designed to give system administrators and end-users the best of the ability to host and centrally manage desktop virtual machines in the data center while giving end users a full PC desktop experience.

Desktop virtualization provides many of the advantages of a terminal server, while providing users with much more flexibility. Each user, for example, might be allowed to install and configure his/her own applications. Users also gain the ability to access their server-based virtual desktop from other locations.

However, there has been a lack of efficient data compression mechanisms to improve network traffic and processing efficiency of the client in a desktop virtualization environment.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for data compression of images using a shared dictionary are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

In graphics remoting systems, graphics data associated with at least a portion of an image generated by an application, such as, for example, a desktop application, is first compressed and then transmitted to a client. Often, a stream of images transmitted to the client contains very similar images (e.g., a clock image transmitted every minute). Embodiments of the present invention provide an improved compression mechanism that employs similarities between images being transmitted to the client. Using a dictionary shared by multiple images, a sequence of pixels in an image can be encoded by a reference to the same sequence in another image that was previously transmitted to the client. The client maintains all the images that constructed the dictionary at the time a specific image was encoded in the server, and can easily decode the specific image using previously transmitted images.

Figure 1:
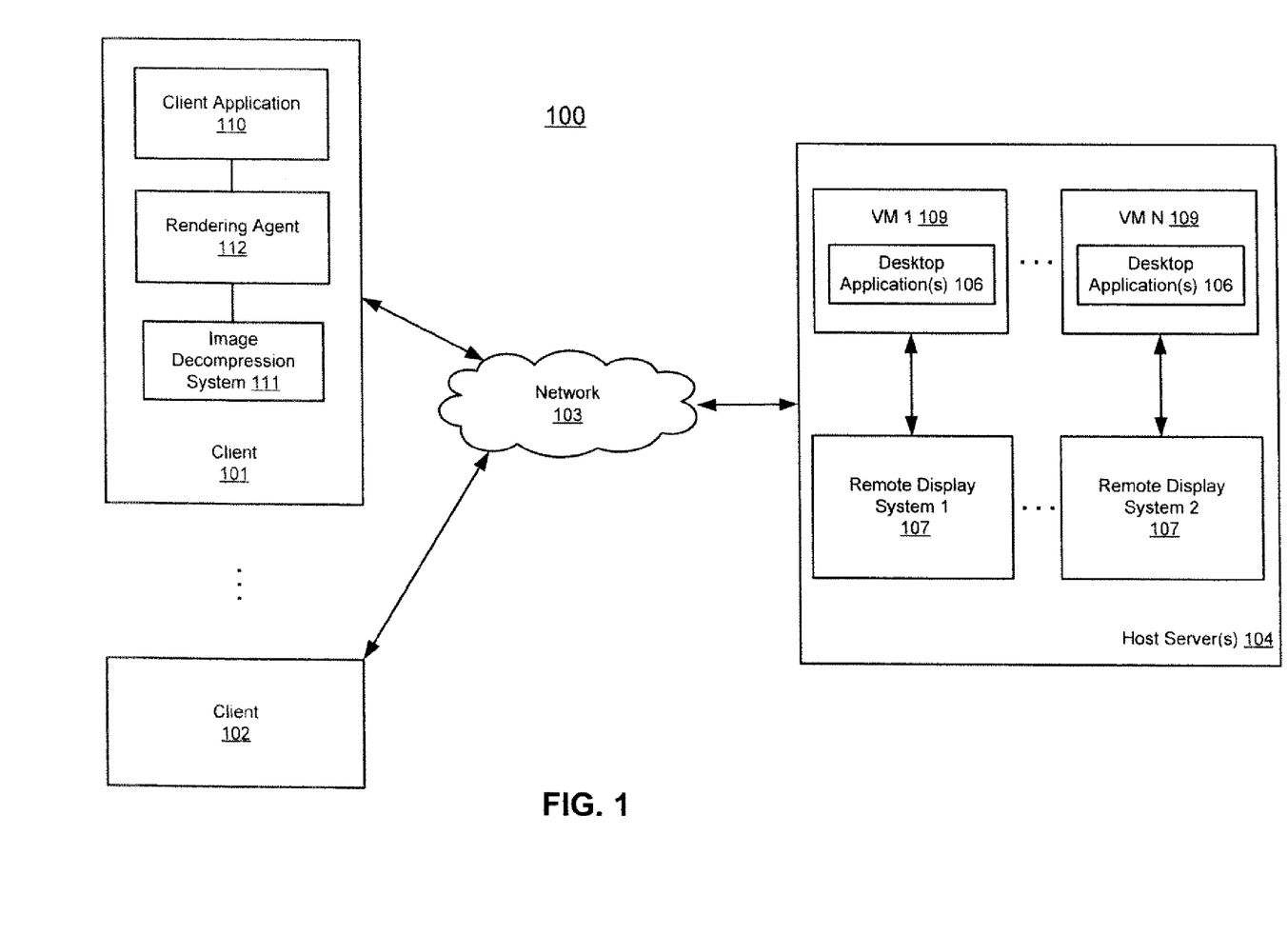
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101-102 communicatively coupled to a remote server or a cluster of servers 104 over a network 103. Network 103 may be a local area network (LAN) or a wide area network (WAN) and may be a combination of one or more networks. Clients 101-102 can be any computer system in communication with server 104 for remote execution of applications at server 104. For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., application 106) can generate output display commands (e.g., graphics commands referred to herein as graphics data), which may include one or more paint and/or draw operations, for example, in the form of executable instructions. The output display commands can then be transmitted (e.g., as graphics update commands) with compression back to the remote client and a remote display driver (e.g., rendering agent 112) of the remote client can collect the graphics commands and generate corresponding drawing commands for rendering at a display device of the client.

In one embodiment, server 104 is configured to host one or more virtual machines 109, each having one or more desktop applications 106 (e.g., desktop operating system). Desktop application 106 may be executed and hosted by an operating environment (e.g., an operating system, not shown) within virtual machine 109. Such an operating system in virtual machine 109 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows operating system from Microsoft and a host OS may be a Linux operating system available from Red Hat. In addition, the guest OSes running on the host 104 can be of the same or different types.

Virtual machine 109 can be any type of virtual machines, such as, for example, hardware emulation, full virtualization, para-virtualization, and operating system-level virtualization virtual machines. Different virtual machines hosted by server 104 may have the same or different privilege levels for accessing different resources.

In one embodiment, server 104, also referred to as a virtual desktop server (VDS), hosts multiple virtual machines (e.g., virtual machine 109), each hosting or maintaining a desktop environment remotely accessed by a client such as clients 101-102, in this example, virtual desktop 106. For the purpose of illustration, virtual desktop 106 represents an output (e.g., a snapshot of an image to be displayed) generated by a desktop application running within virtual machine 109. Graphics data associated with virtual desktop 106 is then captured and streamed to a client such as clients 101-102, where the virtual desktop 106 may be rendered by a rendering agent (e.g., agent 112) and presented by a client application (e.g., application 110) respectively.

In one embodiment, the server 104 hosts a remote display system 107 for each virtual machine 109 that is responsible for transferring graphics data associated with desktop 106 to clients 101-102. In particular, prior to streaming graphics data of desktop 106 to, in this example, client 101, remote display system 107 compresses an image of desktop 106 using a shared dictionary. As will be discussed in more detail below, the shared dictionary employs similarities between images being transmitted to the client and allows a sequence of pixels in an image to be encoded by a reference to the same sequence in another image that was previously transmitted to the client.

The compressed image is then transmitted to client 101 over network 103 using a variety of communications protocols, such as, for example, RDP protocol or a proprietary protocol such as SPICE™ protocol from Red Hat Israel. The client 101 includes an image decompression system 111 that receives the compressed data and decodes it using previously transmitted images stored at the client 101. When the image decompression system 11 decodes a specific image, the images stored at the client 101 are synchronized with images covered in a dictionary that was used by the remote display system 107 when encoding the specific image.

The rendering agent 112 uses the decompressed data to render the desktop image for presentation by client application 110. Client application 110 may be a thin client application such as a browser application, and image data transmitted from the server 104 to the client 101 may include graphics commands (e.g., paint and/or draw commands) as well as other information (e.g., location and/or shape, etc.) such that the client 101 can execute or render the graphics commands to construct an associated virtual desktop image.

System 100 may be implemented within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

In one particular embodiment, server 104 is configured to run the virtualization platform/hypervisor and the virtual desktops. SPICE communication protocol is utilized to communicate between a client and a server. SPICE is a remote rendering technology developed specifically for virtual desktops that allow users to "see" their desktops and interact with them. In this embodiment, a user's desktop runs inside a kernel-based virtual machine (KVM) on the server 104 in the enterprise data center. The user then accesses his/her desktop from a thin client (e.g., client application 110) using SPICE protocol. System 100 may be implemented as part of Solid ICE™ (independent computing environment) virtualization solution available from Red hat Israel. Note that an application related to a virtual desktop is utilized herein as an example throughout this application for illustration purposes only. However, techniques described herein can also be applied to any kinds of graphics remoting applications.

Figure 2:
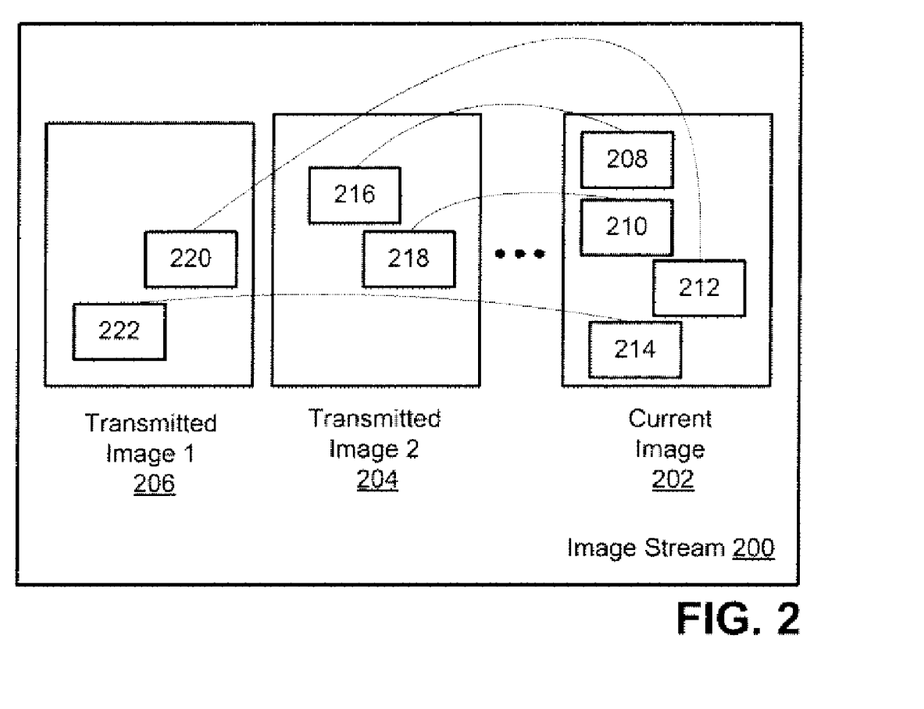
FIG. 2 illustrates an exemplary queue of images generated by a server application, in accordance with one embodiment of the invention.

FIG. 2 illustrates an exemplary stream 200 of images generated by a server application, in accordance with one embodiment of the invention. The stream 200 includes images 204 and 206 that were previously transmitted to a client, and a current image 202 that is being presently compressed. As shown, the current image 202 includes pixel segments 208, 210, 212 and 214 that have matching segments in the images 204 and 206 respectively. The length of matching segments can vary depending on the overall similarity between the images.

The images 202 through 206 share a dictionary that includes data identifying each image (e.g., image ID), locations of individual segments of pixels within each image, and a signature of each segment (e.g., a hash value of the segment). In one embodiment, when a new image is added to the stream of images, the size of the resulting collection of images (referred to herein as an "image window") is checked against a predefined threshold. If the threshold is exceeded, one or more of the least recent images are removed from the image window to bring the size of the image window below the threshold. The dictionary is then updated to delete the data associated with the removed images.

When the current image 202 is processed for compression, pixels in the current image 202 are compared with pixels in the previously transmitted images using the dictionary. If a segment of pixels in the current image has a match in a previously transmitted image, the segment of pixels in the current image is encoded by a reference to the match in the previously transmitted image. When the compression process of the current image is completed, the compressed image is transmitted to a client.

When the client receives the compressed image, the client decodes it using the stored images previously transmitted to the client. The images stored at the client include all the images that were covered in the dictionary at the time the above image was encoded. This synchronization is achieved by maintaining the same image window threshold for the images covered in the dictionary and the images stored at the client.

Figure 3:
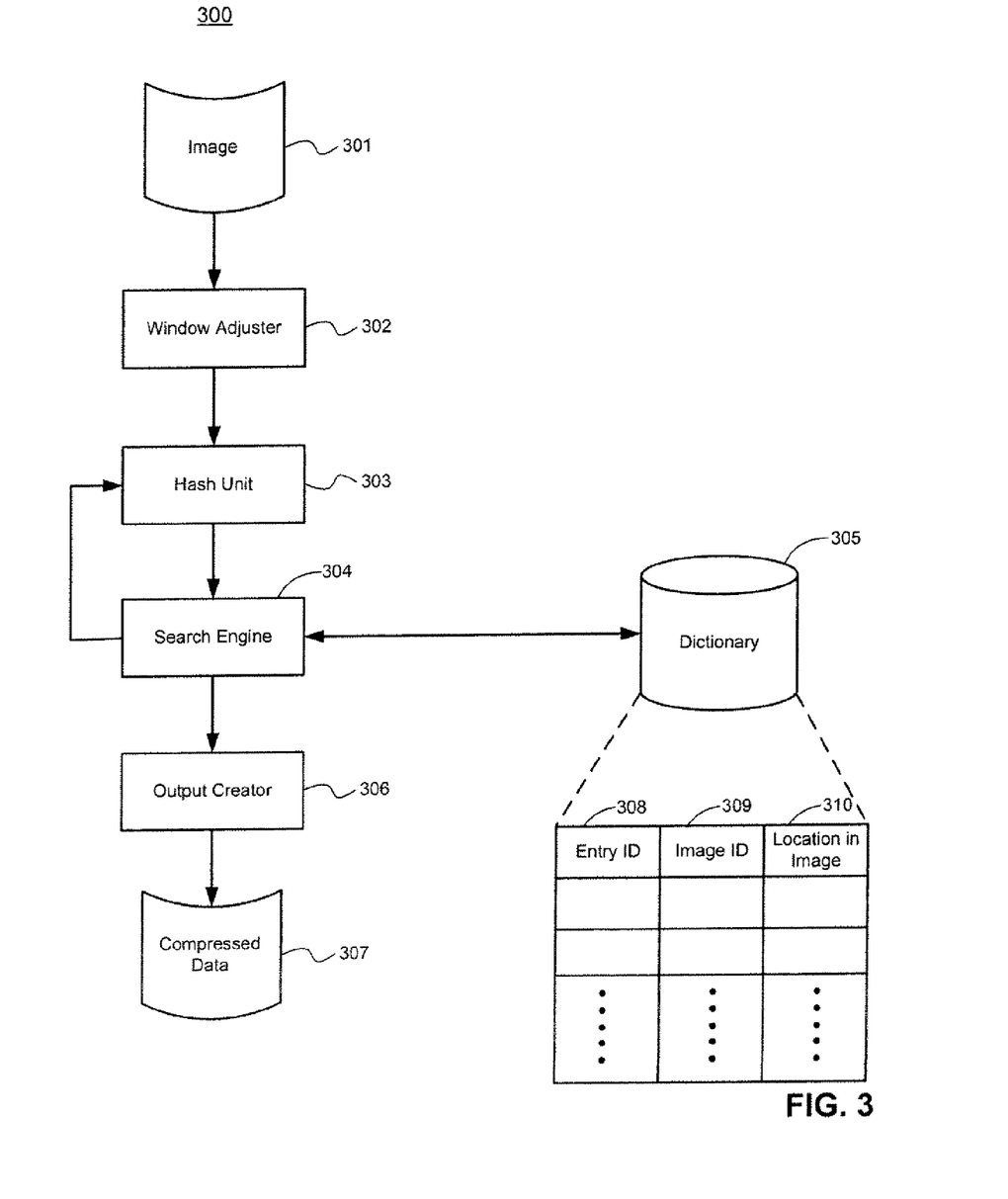
FIG. 3 is a block diagram illustrating a remote display system according to one embodiment of the invention.

FIG. 3 is a block diagram illustrating an exemplary remote display system 300 according to one embodiment of the invention. The remote display system 300 may include a window adjuster 302, a hash unit 303, a search engine 304, an output creator 306 and a dictionary 305.

In one embodiment, the window adjuster 302 adds a current image 301 to the image window that includes images covered in the dictionary and previously transmitted to the client. If the size of the resulting image window exceeds a predefined threshold, one or more of the least recent images in the image window are removed to bring the size of the image window below the predefined threshold. The dictionary 305 includes entries for images in the image window. An entry may include an entry ID 308, an image ID 309, and a location 310 of a segment of pixels within the image.

In one embodiment, the remote display system 300 uses hashing to facilitate efficient search of the dictionary 305. However, various other search techniques can be used with the present invention without loss of generality. In the illustrated embodiment, the hash unit 303 starts with the first segment of pixels of the current image, creates a hash value for this segment of pixels, and adds an entry for this segment of pixels to the dictionary 305. The segment may include one or more pixels. The entry may specify the entry ID for the segment, the ID of the current image, and the location of the segment within the current image. In one embodiment, the entry ID is the hash value of the segment. Although not shown, the entry may also include the length of the segment.

The search engine 304 access the dictionary entry that matches the hash value generated for the segment of pixels that starts at the current location in the image. The search engine 304 retrieves, from the matching entry, a corresponding image ID (image X) and location information (location L). Starting from location L in image X, and the current segment, it looks for the longest match between them. If a match is not found, the search engine 304 provides the coding of the first pixel in the current segment to the output creator 306 and invokes the hash unit 303 to proceed to the next pixel.

If a match is found, the search engine 304 encodes this match using the reference to image X, the reference to location L in image X, and the length of the longest match. In addition, in both cases, the search engine 304 updates the segment's entry in the dictionary 305 with the metadata of the current segment. Further, the search engine 304 invokes the hash unit 303 to continue with the segment of the current image that follows the pixels that were last encoded. The above iterations are repeated until the entire image 301 is processed.

In one embodiment, when performing a search for the current segment, the search engine 304 ignores entries referring to old images that have been deleted from the image window by the image adjuster 302. In particular, when the search engine 304 access an entry that is referring to a deleted image, the search engine 304 determines that the image no longer exists, and ignores this entry.

The output creator 306 uses encoded data provided by the search engine 304 to create compressed image 307 that is transmitted to the client.

As opposed to the LZ-77 algorithm, which is a general algorithm for sequences of bytes, embodiments of the present invention compress RGB images. In particular, in one embodiment, in which hashing is utilized to find a match in the sliding window, an alignment of pixels is used according to the image representation (e.g., in RGB 16 the hashing is performed on 2 bytes aligned sequence and the last bit in each pixel is ignored since only 15 bits are used to encode a pixel). In an RGB-A format, the alpha channel is compressed separately from the RGB channel because each channel has distinguishable repetitive characteristics and compressing them separately is more likely to result in finding repeated sequences.

Further, embodiments of the present invention use an image window that is not limited to the image being currently compressed, but rather contains images that were previously compressed and transmitted to the client. Accordingly, similarities among a stream of images that are very common in remote displays are utilized, significantly reducing the network traffic between the server and the client.

Figure 4:
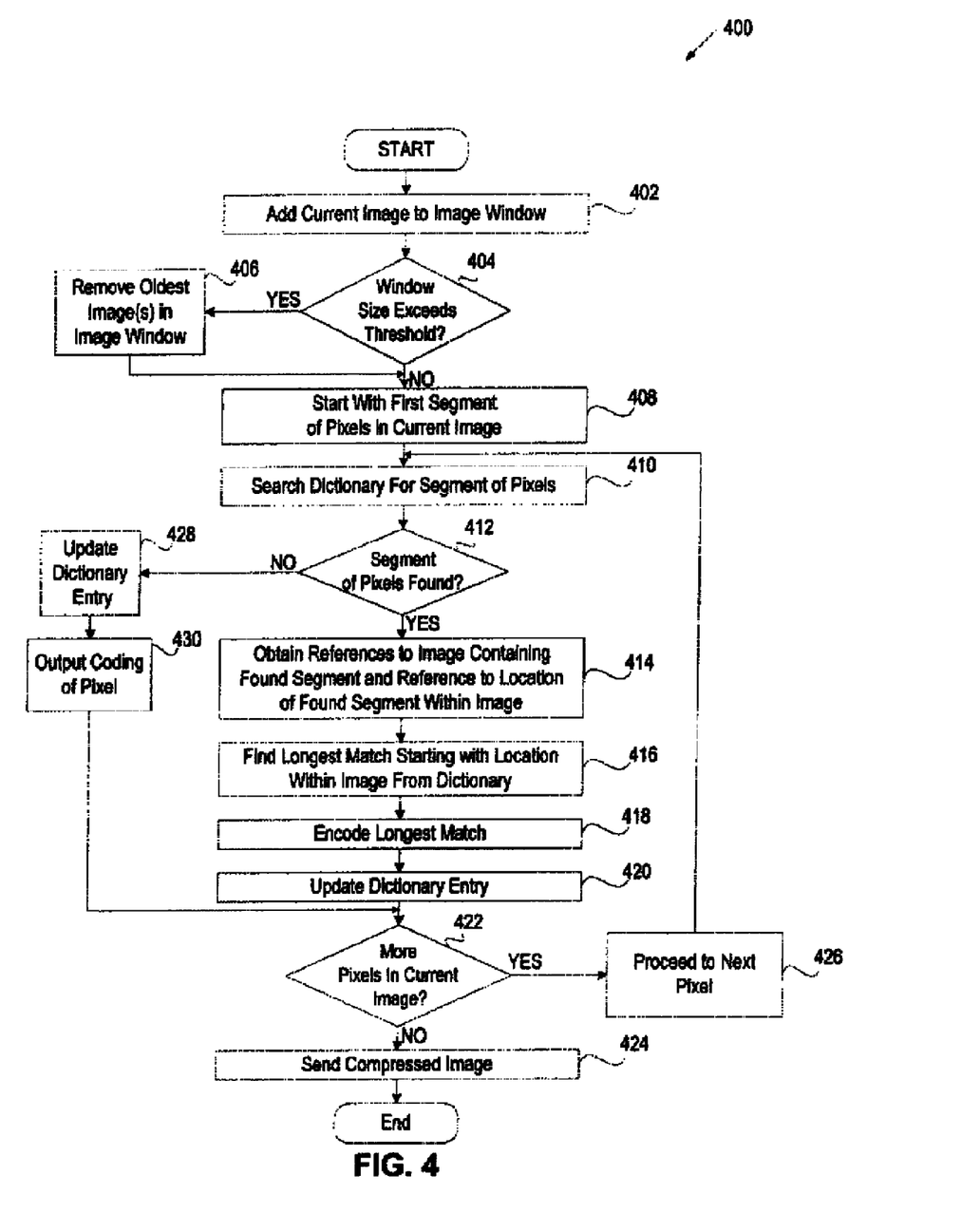
FIG. 4 is a flow diagram illustrating an example of a method for compressing images using a shared dictionary, in accordance with one embodiment of the invention.

FIG. 4 is a flow diagram illustrating one embodiment of a method 400 for compressing images using a common dictionary. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the remote display system 107 of FIG. 1.

Referring to FIG. 4, method 400 begins with adding a current image generated by a server application to an image window (block 402) and determining whether the size of the resulting image window exceeds a predefined threshold (block 404). If not, processing logic proceeds to block 408. If so, processing logic removes the least recent image(s) in the image window until the size of the image window no longer exceeds the threshold (block 406) and proceeds to block 408.

At block 408, processing logic identifies the first segment of pixels in the current image. Depending on the employed search technique, processing logic may create a signature of the segment (e.g., a hash value), pre-process the segment in some other way or use the actual data of the segment.

At block 410, processing logic searches the shared dictionary for an entry corresponding to the present segment of pixels. As discussed above, the search may be performed using hashes, suffix tree, actual data, etc.

If processing logic does not find an entry corresponding to the present segment of pixels (block 412), processing logic updates the entry for the present segment of pixels in the shared dictionary (block 428), outputs the coding of the first pixel in the present segment, and proceeds to block 430. Otherwise, if processing logic finds an entry corresponding to the present segment of pixels, processing logic obtains metadata information from this entry (a reference to a previously transmitted image and a reference to the location of the matching segment within the previously transmitted image) (block 414). Using the metadata, processing logic extends the search to find the longest match between the previously transmitted image and the current image, starting at the location of the matching segment within the previously transmitted image (block 416). Next, processing logic encodes the longest match using the metadata (the above reference to the previously transmitted image, the starting location of the match within the previously transmitted image and the length of the match) (block 418), and updates the entry for the present segment in the dictionary using the current image and the location of the segment in the current image (block 420).

At block 422, processing logic determines whether the current image contains more pixels that have not been processed. If not, processing logic sends the resulting compressed image to the client (block 424). If so, processing logic proceeds to the next pixel in the current image (block 426) to define a next segment, and further proceeds to block 410.

Figure 5:
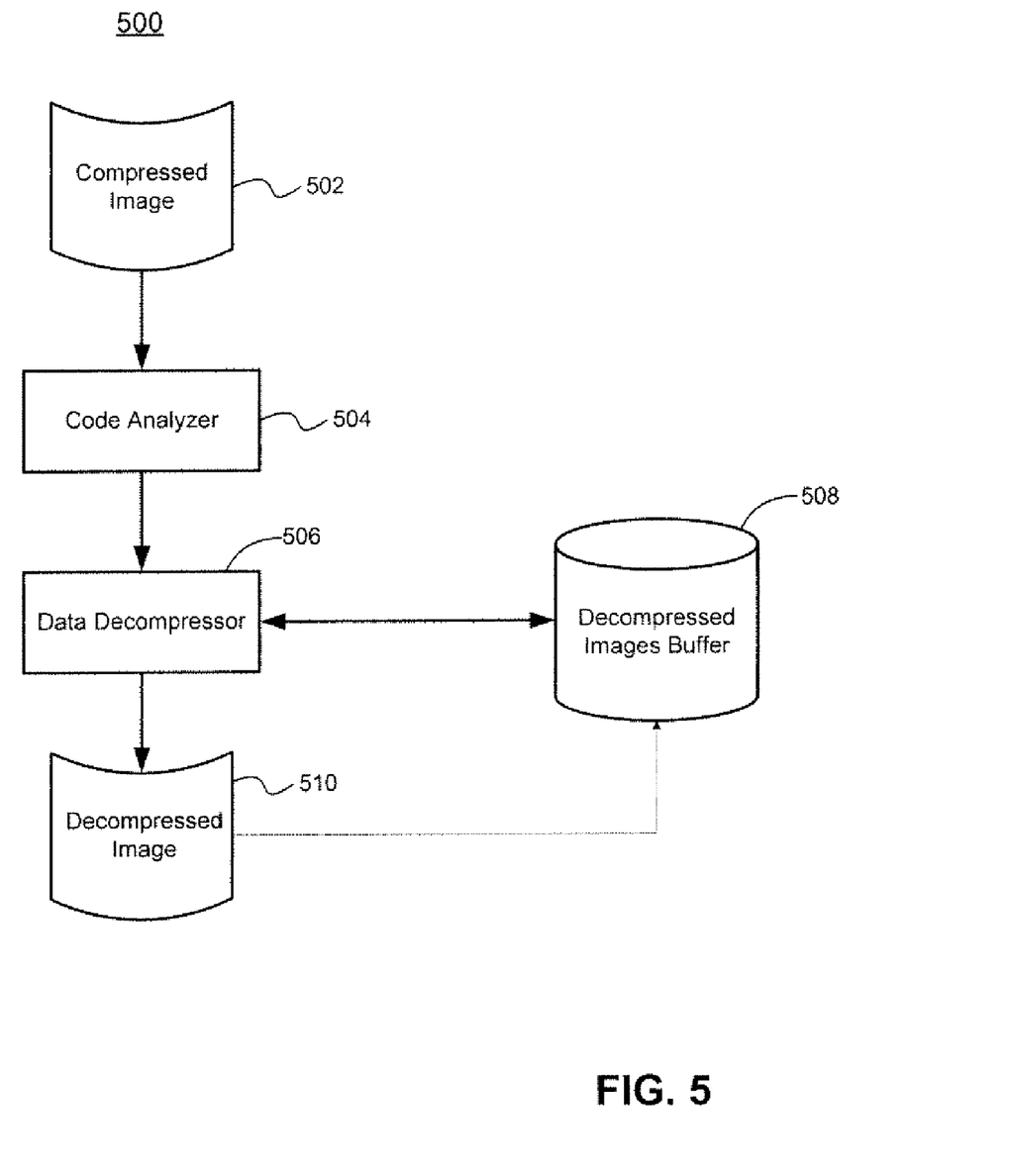
FIG. 5 is a block diagram illustrating an image decompression system according to one embodiment of the invention.

FIG. 5 is a block diagram illustrating an image decompression system 500 according to one embodiment of the invention. The image decompression system 500 may include a code analyzer 540, a data decompressor 506 and a decompressed images buffer 508.

The code analyzer 504 receives compressed image 502 and determines whether the first code in the image 502 includes metadata (a reference to another image, a reference to the location of a segment in the other image, and the length of the segment). If not (i.e., the code encodes one pixel), the code analyzer 504 outputs the pixel, and proceeds to the next code.

If the code in the image 502 includes metadata, the code analyzer 504 provides the metadata to the data decompressor 506, which then finds the relevant image in the decompressed images buffer 508, finds the appropriate location in the relevant image, fetches the segment of pixels of the specified length from the appropriate location in the relevant image, and outputs the fetched segment of pixels. The data decompressor 506 then invokes the data analyzer 504 to proceed to the next code. The above operations are repeated until all the code in the compressed image 502 is processed, at which point the resulting decompressed image 510 is added to the decompressed images buffer 508.

In one embodiment, the size of the decompressed images buffer 508 is limited to a predefined threshold used for the image window in the compression processing of the server. Consequently, when the current image 510 is added to the decompressed images buffer 508, the size of the decompressed images buffer 508 is checked against the predefined threshold. If the threshold is exceeded, the least recent images are removed from the decompressed images buffer 508 one by one until the buffer size no longer exceeds the threshold.

Figure 6:
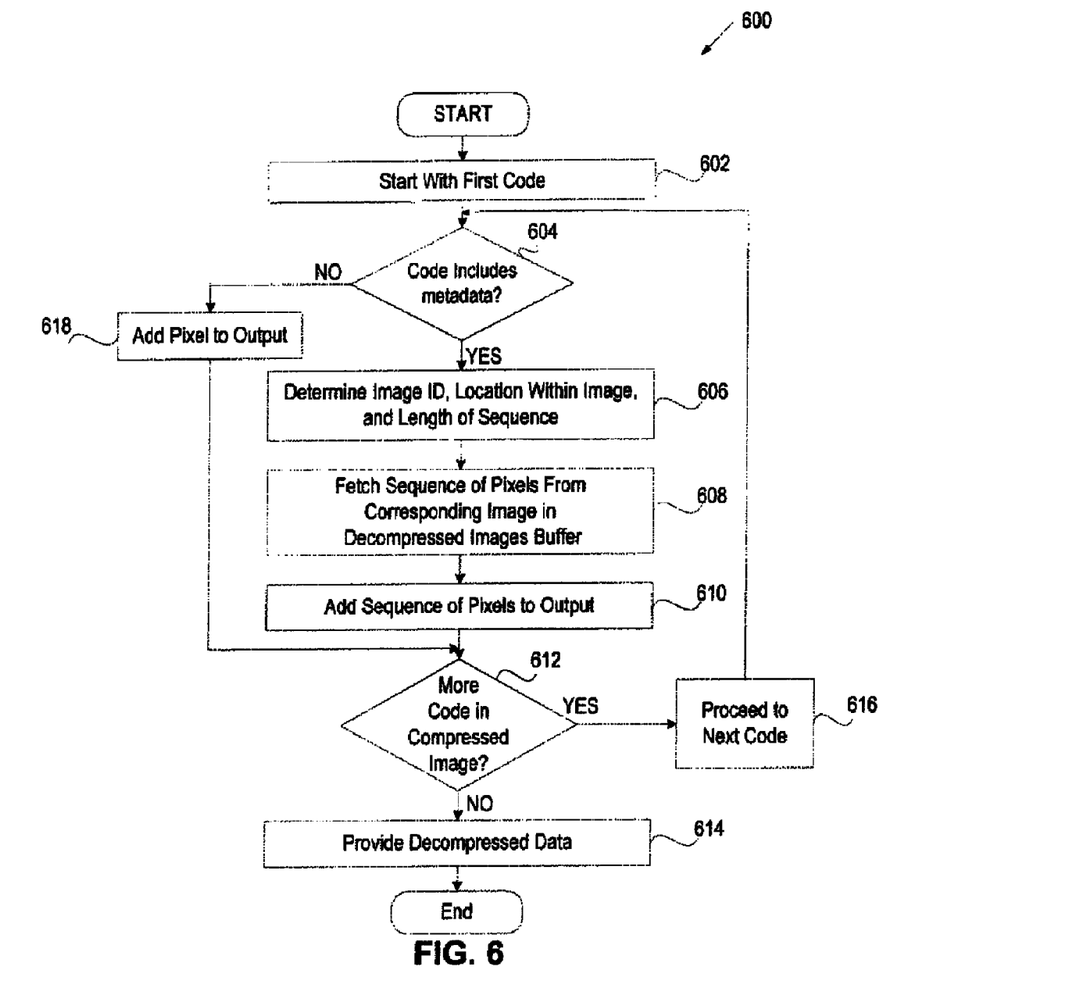
FIG. 6 is a flow diagram illustrating an example of a method for decompressing images using a set of images, in accordance with one embodiment of the invention.

FIG. 6 is a flow diagram illustrating one embodiment of a method 600 for decoding an image using a set of previously received images. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by the image decompression system 111 of FIG. 1.

Referring to FIG. 6, method 600 begins with receiving a compressed image and analyzing the first code in the compressed image (block 602). If the code includes metadata (a reference to another image, a reference to the location of a segment of pixels in the other image, and the length of the segment of pixels) (block 604), processing logic determines the image ID and the location from the metadata (block 606), fetches the segment of pixels of the specified length from the appropriate location in the identified image (block 610), and adds the fetched sequence of pixels to the output (block 610). If the code does not include metadata, processing logic adds the encoded pixel to the output (block 618).

At block 612, processing logic determines whether the compressed image has more code. If so, processing logic proceeds to the next code and continue operations starting at block 604. If not, processing logic adds the resulting decompressed image to the set of images stored at the client for use in decoding of future compressed images (block 614). As discussed above, if the size of the stored images exceeds a predefined threshold, the least recent images are deleted one by one until the size no longer exceeds the predefined threshold.

Figure 7:
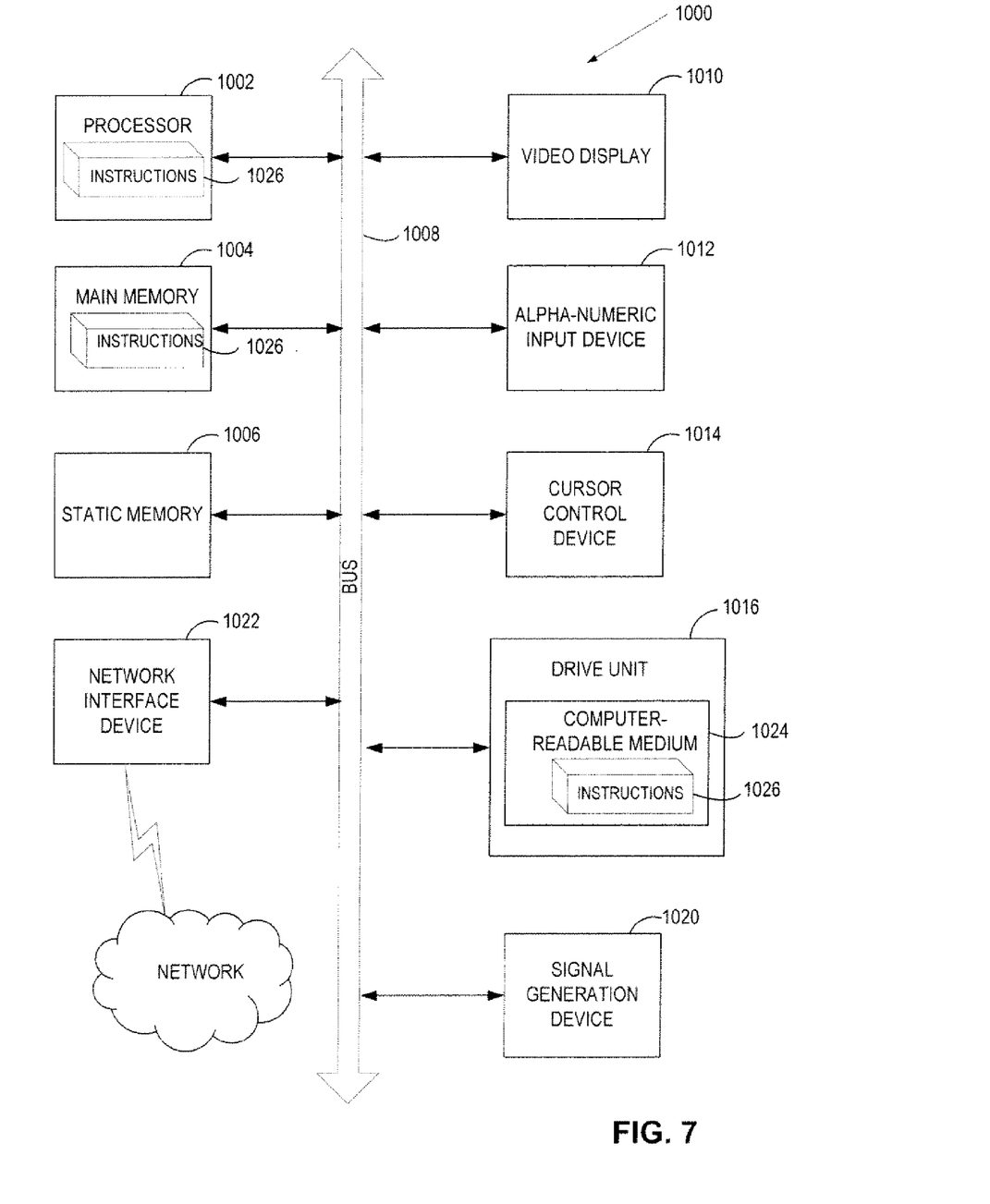
FIG. 7 is a block diagram illustrating an example of a data processing system which may be used with an embodiment of the invention.

FIG. 7 is a block diagram illustrating a data processing system which may be used with an embodiment of the invention. For example, system 1000 may be implemented as part of a client and/or a server described above. System 1000 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a machine-accessible storage medium 1024 on which is stored one or more sets of instructions 1026 (e.g., software) embodying any one or more of the methodologies or functions described herein. The software may also reside, completely or at least partially, within the main memory 1004 and/or within the processor 1002 during execution thereof by the computer system 1000, the main memory 1004 and the processor 1002 also constituting machine-accessible storage media. The software may further be transmitted or received over a network via the network interface device 1022.

Thus, techniques for data compression of images using a shared dictionary have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   identifying, at a server computer, a current image of a stream of images generated by an application on the server computer, the stream of images comprising images previously transmitted to a client and the current image;
   for each segment of pixels in the current image searching a dictionary for an entry for pixels from a previously transmitted image that match the segment of pixels in the current image, the dictionary being maintained by the server computer to store data for the stream of images; and
   if the dictionary includes the entry for a matching segment of pixels from the previously transmitted image:
   identifying a location of the matching segment of pixels within the previously transmitted image based on the entry;
   continuing searching the dictionary to find a longest match between the current image and the previously transmitted image, starting with the location of the matching segment of pixels in the previously transmitted image and a location of the matching segment of pixels in the current image;
   determining metadata for the segment of pixels in the current image using a result of the continuing searching;
   encoding the current image using the determined metadata and not the matching segment of pixels from the current image; and
   transmitting the encoded image to the client.

2. The method of claim 1, wherein the metadata for the segment of pixels in the current image comprises an identifier of the previously transmitted image that includes the matching segment of pixels, the location of the matching segment of pixels within the previously transmitted image, and a length of the matching segment of pixels.

3. The method of claim 1, further comprising:
   adding a dictionary entry for the matching segment of pixels using an identifier of the current image and a location of the matching segment of pixels within the current image.

4. The method of claim 1, further comprising:
   determining whether a size of the stream of images exceeds a predefined size of an image window; and
   if the size of the stream of images exceeds the predefined size of the image window, determining which least recent images need to be removed from the image window to satisfy the predefined size of the image window, and removing the determined least recent images from the image window.

5. The method of claim 1, wherein searching the dictionary comprises:
   performing a hash operation on the matching segment of pixels from the current image to generate a hash value; and
   searching the dictionary for the entry with a matching hash value.

6. The method of claim 1, wherein the current image is generated from a desktop application executed within a virtual machine (VM) and accessed remotely by the client over the network.

7. A non-transitory computer readable storage medium including instructions that, when executed by a processing system, cause the processing system to perform a method comprising:
- identifying, at a server computer, a current image of a stream of images generated by an application on the server computer, the stream of images comprising images previously transmitted to a client and the current image;
- for each segment of pixels in the current image, searching a dictionary for an entry for pixels from a previously transmitted image that match the segment of pixels in the current image, the dictionary being maintained by the server computer to store data for the stream of images; and
- if the dictionary includes the entry for a matching segment of pixels from the previously transmitted image:
- identifying a location of the matching segment of pixels within the previously transmitted image based on the entry;
- continuing searching the dictionary to find a longest match between the current image and the previously transmitted image, starting with the location of the matching segment of pixels in the previously transmitted image and a location of the matching segment of pixels in the current image;
- determining metadata for the segment of pixels in the current image using a result of the continuing searching;
- encoding the current image using the determined metadata and not the matching segment of pixels from the current image; and
- transmitting the encoded image to the client.

8. The computer readable storage medium of claim 7, wherein the metadata for the matching segment of pixels in the current image comprises an identifier of the previously transmitted image that includes the matching segment of pixels, the location of the matching segment of pixels within the previously transmitted image, and a length of the matching segment of pixels.

9. The computer readable storage medium of claim 7, wherein the method further comprises:
- adding a dictionary entry for the matching segment of pixels using an identifier of the current image and a location of the matching segment of pixels within the current image.

10. The computer readable storage medium of claim 7, wherein the method further comprises:
- determining whether a size of the stream of images exceeds a predefined size of an image window; and
- if the size of the stream of images exceeds the predefined size of the image window, determining which least recent images need to be removed from the image window to satisfy the predefined size of the image window, and removing the determined least recent images from the image window.

11. The computer readable storage medium of claim 7, wherein searching the dictionary comprises:
- performing a hash operation on the matching segment of pixels from the current image to generate a hash value; and
- searching the dictionary for the entry with a matching hash value.

12. A system, comprising:
- a server computer comprising a processor and a memory, coupled to the processor, to store a dictionary including data for a stream of images generated by an application on the server computer, the stream of images containing images previously transmitted to a client;
- the server computer further comprising a remote display system to cause the processor to:
- identify a current image of the stream of images;
- for each segment of pixels in the current image, search a dictionary for an entry for pixels from a previously transmitted image that match the segment of pixels in the current image; and
- if the dictionary includes the entry data for a matching segment of pixels from the previously transmitted image:
- identify a location of the matching segment of pixels within the previously transmitted image based on the entry;
- continue searching the dictionary to find a longest match between the current image and the previously transmitted image, starting with the location of the matching segment of pixels in the previously transmitted image and a location of the matching segment of pixels in the current image;
- determine metadata for the matching segment of pixels in the current image using a result of the continued searching;
- encode the current image using the determined metadata and not the segment of pixels from the current image; and
- transmit the encoded image to the client.

13. The system of claim 12, wherein the metadata for the matching segment of pixels in the current image comprises an identifier of the previously transmitted image that includes the matching segment of pixels, a location of the matching segment of pixels within the previously transmitted image, and a length of the matching segment of pixels.

14. The system of claim 12, wherein the remote display system is further to add a dictionary entry for the matching segment of pixels using an identifier of the current image and a location of the matching segment of pixels within the current image.

15. The system of claim 12, wherein the remote display system is further to:
- determine whether a size of the stream of images exceeds a predefined size of an image window; and
- if the size of the stream of images exceeds the predefined size of the image window, determine which least recent images need to be removed from the image window to satisfy the predefined size of the image window, and remove the determined least recent images from the image window.

16. The system of claim 12, further comprising:
- a client computer coupled to the server computer via a network, the client computer hosting an image decompression system to
- receive a compressed image of the stream of images generated by the application on the server computer;
- find, in the compressed image, metadata specifying a reference to a sequence of pixels from one of the previously transmitted images; and
- create a decompressed image using the sequence of pixels fetched from the previously transmitted image.

17. The system of claim 16, wherein the image decompression system is further to:
- add the decompressed image to the stream of images stored at the client computer;
- determine whether a size of the stream of images exceeds a predefined size of an image window; and
- if the size of the stream of images exceeds the predefined size of the image window, remove one or more least recent images from the stream of images.

* * * * *